(12) United States Patent
Bloch et al.

(10) Patent No.: US 7,054,594 B2
(45) Date of Patent: May 30, 2006

(54) DATA SECURITY DEVICE

(75) Inventors: Stephen Bloch, London (GB); Saban Demirbasa, London (GB); Alistair Curry, London (GB)

(73) Assignee: Data Transfer & Communication Limited, Hazelwood (GB)

( * ) Notice: Subject to any disclaimer, the term of this patent is extended or adjusted under 35 U.S.C. 154(b) by 17 days.

(21) Appl. No.: 10/484,025

(22) PCT Filed: Jul. 18, 2002

(86) PCT No.: PCT/GB02/03274

§ 371 (c)(1),
(2), (4) Date: Jan. 15, 2004

(87) PCT Pub. No.: WO03/009620

PCT Pub. Date: Jan. 30, 2003

(65) Prior Publication Data

US 2004/0235514 A1    Nov. 25, 2004

(30) Foreign Application Priority Data

Jul. 18, 2001  (GB) ................... 0117530.6
Apr. 5, 2002   (GB) ................... 0207933.3

(51) Int. Cl.
*H04B 7/00*    (2006.01)
*H04B 7/38*    (2006.01)
*G06F 7/04*    (2006.01)
*G06F 15/16*   (2006.01)
*G08B 13/14*   (2006.01)

(52) U.S. Cl. .................. 455/41.2; 455/567; 726/7; 340/572.1; 709/246

(58) Field of Classification Search ............... 455/421, 455/425, 41.2, 100; 340/539.15, 539.21, 340/572.1, 628; 713/201; 361/683; 709/217, 709/246; 726/7; 707/204
See application file for complete search history.

(56) References Cited

U.S. PATENT DOCUMENTS

| 4,380,760 A | * | 4/1983 | Kornblit .................. 340/628 |
| 5,448,221 A | * | 9/1995 | Weller .................. 340/539.21 |
| 5,539,665 A | * | 7/1996 | Lamming et al. ........... 709/224 |
| 5,638,423 A |   | 6/1997 | Grube et al. |
| 5,930,703 A |   | 7/1999 | Cairns |

(Continued)

FOREIGN PATENT DOCUMENTS

EP    0555992 A1    8/1993

(Continued)

*Primary Examiner*—William Trost
*Assistant Examiner*—Kiet Doan
(74) *Attorney, Agent, or Firm*—Stites & Harbison PLLC; Ross F. Hunt, Jr.

(57) ABSTRACT

A method of safeguarding against loss of data stored in a portable data storage device or loss of the data storage device itself is described. A user-carried backup device having memory and a wireless communication link for communicating with the portable data storage device is provided. The backup device and the portable data storage device communicate periodically or quasi-continuously over the wireless communication link and may backup data entered into the portable data storage device and check for removal of the portable data storage device. An alarm is activated to alert a user to loss of the portable data storage device if the portable data storage device is out of range of communication for a predetermined period.

15 Claims, 4 Drawing Sheets

U.S. PATENT DOCUMENTS

| | | | |
|---|---|---|---|
| 6,091,329 A * | 7/2000 | Newman | 340/539.15 |
| 6,134,437 A | 10/2000 | Karabinis et al. | |
| 6,151,493 A | 11/2000 | Sasakura et al. | |
| 6,160,481 A * | 12/2000 | Taylor, Jr. | 340/573.4 |
| 6,317,755 B1 * | 11/2001 | Rakers et al. | 707/204 |
| 6,614,350 B1 * | 9/2003 | Lunsford et al. | 340/572.1 |
| 6,732,278 B1 * | 5/2004 | Baird et al. | 726/7 |
| 6,795,304 B1 * | 9/2004 | Lam | 361/683 |
| 2001/0002211 A1 | 5/2001 | Lee | |
| 2001/0025302 A1 * | 9/2001 | Suzuki et al. | 709/217 |
| 2002/0010868 A1 * | 1/2002 | Nakashima et al. | 713/201 |
| 2002/0013784 A1 * | 1/2002 | Swanson | 707/104.1 |
| 2002/0018547 A1 * | 2/2002 | Takae et al. | 379/201.02 |
| 2002/0066027 A1 * | 5/2002 | Johnson et al. | 713/201 |
| 2002/0156921 A1 * | 10/2002 | Dutta et al. | 709/246 |
| 2003/0158831 A1 * | 8/2003 | Zaremba | 707/1 |

FOREIGN PATENT DOCUMENTS

| | | |
|---|---|---|
| EP | 0788630 B1 | 8/1997 |
| EP | 0798651 A2 | 10/1997 |
| EP | 1059819 A1 | 12/2000 |
| EP | 1075155 A1 | 2/2001 |
| EP | 1 158 511 A2 * | 4/2001 |
| EP | 1158511 * | 4/2001 |
| EP | 1102191 A2 | 5/2001 |
| EP | 1158511 A | 11/2001 |
| GB | 2359461 A | 8/2001 |
| GB | 2365699 A | 2/2002 |
| GB | 2373139 A | 9/2002 |
| GB | 2373683 A | 9/2002 |
| WO | WO 94/12938 A | 6/1994 |
| WO | WO 98/34417 A | 8/1998 |
| WO | WO 98/58509 A | 12/1998 |
| WO | WO 99/34631 A | 7/1999 |
| WO | WO 99/59360 A | 11/1999 |
| WO | WO 01/35193 A | 5/2001 |
| WO | WO 02/19664 A | 3/2002 |

* cited by examiner

DATA SECURITY DEVICE

This application is a filing under 35 U.S.C 371 based on International Application No. PCT/GB02/03274, filed on Jul. 18, 2002, and claims the benefit of priority from GB Application No. 0117530.6, filed Jul. 18, 2001; and GB Application No. 0207933.3, filed Apr. 5, 2002, the contents of which are incorporated herein by reference in their entirety for all purposes.

The present invention is concerned with the security of data stored on portable data storage devices, particularly, but not exclusively devices such as hand-held organisers or PDA devices or mobile telephones, most particularly mobile telephones. The invention is also concerned with the security of the portable data storage devices themselves.

In recent years, there has been a widespread increase in the usage of small portable devices for the storage of important data such as contact and calendar information. Devices have become much more user-friendly, much smaller and much more powerful increasing the number of applications for such devices and the usefulness of such devices. The increasing portability and power of such devices has had many benefits but has one drawback, namely that it is easy to mislay or lose a device containing large amounts of useful data.

The risk of loss or damage has been appreciated and many devices are provided with the facility to backup data onto another device, such as a desktop or other computer. Often this involves making a physical connection using a cable although devices with IrDa (infra-red) communication interfaces are available. The backup process, however it is implemented, normally requires positive intervention on the part of the user and can be labourious. As a result, data on portable devices may not be backed up very frequently. Thus, even a user-of above average diligence in backing up the data is liable to lose a significant amount of useful data in the event of loss of the device.

The present invention aims generally to address the problem of reducing the risk of loss of data stored in a portable data device, particularly a mobile telephone.

In a first aspect, the invention provides a method of safeguarding against loss of data stored in a portable data storage device, the method comprising providing user-carried a backup device having memory and a wireless communication link for communicating with the portable data storage device;

communicating periodically or quasi-continuously over the wireless communication link with the portable data storage device to backup data entered into the portable data storage device and to check for removal of the portable data storage device;

signalling an alarm to alert a user to loss of the portable data storage device if the portable data storage device is out of range of communication for a predetermined period.

In this way, the backup device contains data (or selected data) stored in the portable storage device and so, if the device is lost, the backup data can be retrieved. Furthermore, if the device is moved out of range, an alarm is sounded so that the user is alerted that they have left the portable storage device behind. The alarm is preferably provided by the backup device, preferably as at least an audible (and/or vibrating and/or visible) alarm. However, an alarm may be provided additionally or alternatively by the portable data storage device.

Thus, embodiments of the invention may both avoid the need for regular manual backup and reduce the risk of loss of the device in the first place. The solution provided by the invention effectively reduces both the risk of loss of the device and the risk of loss of data even if the device is lost, most conveniently using a single communication link to achieve both functions. Although detection of the devices being out of range may be conveniently achieved by detecting breakdown of the communication link, this detection may be supplemented or substituted by a further ranging function, for example if a more precise specification of range is required or if an early warning of the limits of the range being exceeded is desired while a communication link still exists.

An alert procedure, for example the activation of the alarm and/or the disabling of the portable data storage device, may be initiated when the secondary further-ranging communication link comes into use. Hence, initiation of the alert procedure may either be an active process, for example the alert procedure may be activated on receipt of a signal over the secondary further-ranging communication link, or it may be a process which is initiated due to the lack of a signal, for example the process may be initiated when the communication over the first communication link fails.

The communication link is preferably a short-range link. It will be appreciated that the effective range need not be precisely defined and in practice will vary depending on ambient conditions but should be set so that the communication link breaks down at a separation distance between the two devices consistent with the user having left the data storage device behind. Typically, this distance will be of the order of 10 metres but smaller or greater distances may be employed depending on the application. The distance may be selectable by the user. For example, if the user wishes to be alerted to possible theft of the device in a crowded place such as on public transport, a separation distance of the order of 1 metre or possibly even less may be appropriate to trigger the alert. If a user is working in a large open-plan office space and is happy to leave the data device in the office but wishes to be alerted to having left it behind when he leaves the building, a distance of 50 metres or even 100 metres may be appropriate.

In addition to operating the backup device at a number of different range settings, the backup device may also operate at a selected one of a number of different retry rates. That is, the backup device may communicate with the portable data storage device at predetermined intervals. These intervals may be user defined or selected. Alternatively, they may be correlated to the range settings described above, for example the backup device may communicate with the portable data storage device a number of times each second if the separation distance is required to be less than 1 metre, but only at intervals of several seconds if the separation distance may be up to 100 metres. A further alternative is for the intervals to increase automatically over time if the separation between the devices remains constant. For example, the interval may be decreased from a second to several seconds if the portable data storage device and the backup device are not separated by more than a few metres over a time period of an hour (for example, if the owner of the portable data storage device is sitting close to the device at a desk in an office).

It will be appreciated then that communication between the backup device and the portable data storage device may be operated at a selected one of a number of different power levels. This may help to conserve the power for the backup device and the portable data storage device in some situations. For example, when only infrequent communication with the portable data storage device is required, when communication is required only over a short range, or when backup of data across the communication link is not required, the communication link may operate at a lower power level. The communication range or frequency of communication may be selected automatically or manually, hence allowing the automatic selection of the most suitable power level for the operation of the portable data storage device and backup device. For example, the communication link may operate initially at a first power level, but may switch to operating at a second power level if the portable data storage device does not pass out of range of communication with the backup device throughout a predetermined time period. In this example, operating at a lower power level may comprise reducing the frequency of communication between the portable data storage device and the backup device, or reducing the range of the communication link.

Most preferably, the communication link is a wireless radio link and most preferably, the link is a Bluetooth (Registered Trade Mark) (or similar) radio link. Bluetooth (RTM) operates at approximately 2.4 GHz and provides secure communication between devices up to distances of the order of 10 metres, which is ideal for the present application. However, other forms of radio link may be used, for example a 415 MHz low power transceiver link, as used, for example, for remote control alarm keys and the like. The latter also has the advantage that low-cost compact transceivers are readily available. An advantage of using higher frequencies is that more compact transceivers can be employed whilst still having relatively efficient antenna for the radio transceiver. Nevertheless, in view of the short communication distances required, as will be appreciated, any of a variety of available frequencies may be used. In a further embodiment, an alternative wireless communication link, such as an 802.11a or 802.11b link may be used.

The wireless link need not use radio; for example, an ultrasonic link may be employed in certain cases. In certain cases, a contact based link may be employed, for example based on transmission of data by coupling to a user's body.

Preferably, at least one unique identifier of the portable data storage device may be transferred over the wireless communication link to the backup device. This unique identifier may be an IMEI number, if the portable data storage device is a mobile telephone, or, more preferably, the unique identifier may be a Bluetooth (RTM) serial number. Each Bluetooth (RTM) chip has a unique Bluetooth (RTM) serial number, which it difficult to alter. Hence the Bluetooth (RTM) serial number may be used as a reliable and unique 'tag' for the portable data storage device.

According to a related and highly preferable feature, the data transferred to the backup device may include at least one of: a unique identifier of the portable data storage device, a unique identifier of a subscriber module associated with the portable data storage device and user profile data for the portable data storage device.

Preferably, the portable data storage device is a mobile telephone and the unique identifier of the portable data storage device is the International Mobile Equipment Identity (IMEI) number of the mobile telephone. Further preferably, the unique identifier of a subscriber module associated with the portable data storage device is an identifier of the Subscriber Identity Module (SIM).

Backing up an identifier of the portable data storage device to the backup device may allow a lost or stolen portable data storage device to be uniquely identified without a user actively discovering and storing the identifier. For example, the IMEI number of a mobile telephone may be transferred to the backup device so that the IMEI number may be transferred to the operator of the mobile telecommunications network if the mobile telephone is lost or stolen. This may allow the operator to prevent use of the lost or stolen mobile handset that corresponds to that IMEI number immediately.

According to one embodiment, a user whose portable data storage device or mobile telephone has been lost or stolen may present the backup device, onto which the unique identifier, for example the IMEI number, has been stored to an authorised controller, for example the mobile telephone network operator or the police. The authorised controller may download the information stored in the backup device and may, for example, use the IMEI number to block use of the mobile telephone handset or to track the handset. The user may transfer the data from the backup device to the mobile telephone network operator at an easily accessible location, for example at a retail outlet connected to the mobile telephone network operator. The retail outlet preferably has a central control device which can read data stored on each backup device. In this way, the IMEI number can be easily and quickly transferred to the network operator without the portable data storage device user having to actively discover and retain the IMEI number.

Further data may also be transferred to the backup device, for example, the SIM identifier of a mobile telephone may be stored in the backup device and the mobile telephone operator may use the data to prevent use of a lost or stolen mobile telephone or SIM card.

Having data such as the IMEI number and SIM identifier easily available may increase security for users of the mobile telephone network and may prevent the use of lost or stolen mobile telephones.

According to a further, highly preferably feature, the portable data storage device is a mobile telephone and the user profile data for the portable data storage device includes at least one of: data stored in the mobile telephone handset, call settings, telephone settings, security settings, call divert settings, display settings, tone settings, message settings, call register settings, available prepaid credit and internet access settings.

The user profile data may include, for example the PIN code used to access the portable data storage device and the settings of the portable data storage device, such as ring-tone settings or keypad tone settings. The type of user profile data that is stored on the backup device will depend on the type of portable data storage device. According to a preferable embodiment, it is possible for the user profile data stored on the backup device to be downloaded onto a new portable data storage device. This may be useful, for example, if a user loses the portable data storage device or has it stolen, or if the user purchases a new portable data storage device. In these situations, the user profile information stored in the backup device may be uploaded to the new portable data storage device, so that the new portable data storage device can be set up very quickly to operate in essentially the same way as the lost, stolen or old portable data storage device. This may allow the user to start using the portable data storage device as quickly as possible without having to reset all of the settings and user-preferences manually.

The data may be uploaded from the backup device to the new portable data storage device by the user but is preferably uploaded by the vendor of the new portable data storage device. This may be done in conjunction with the vendor obtaining information on behalf of the network, such as obtaining the IMEI number of the lost or stolen mobile telephone, as described above.

Preferably, the method includes receiving a user input to cancel an alert or to disable the alarm. The user input may be provided prior to the alarm being activated or after the alarm has been activated. This enables a user to keep the backup device with them and not be constantly alerted to having (deliberately) left their data storage device elsewhere.

In order to avoid further unnecessary triggering of the alarm, signalling of the alarm may be suspended if the wireless communication link is being used by the portable data storage device. Preferably, the backup device has the capability to detect whether the wireless communiction link is being used by the portable data storage device. For example, if the wireless communication link is being used by the portable data storage device to communicate with a further device, for example a computer, it may not be possible for the portable data storage device to maintain its periodic communication with the backup device. In order to avoid an alert being triggered in this situation, however, the backup device may detect the use of the Bluetooth (RTM) link by the portable data storage device and suspend triggering of the alarm.

Instead of, or in addition to the alarm being signalled, an alert procedure may be initiated by the portable data storage device if the portable data storage device is out of range of communication with the backup device for a predetermined period. This alert procedure may comprise any of the procedures outlined below. A preferable alert procedure, however, may involve the at least partial disabling of the portable data storage device. For example, as described in more detail below, the keypad of a mobile telephone may be disabled, or a signal may be sent to a network, for example the mobile telecommunications network, to prevent the use of that portable data storage device over the network.

In a most preferred application, the data storage device is configured so as to be at least partially inoperable in the absence of communication with the backup device. The data storage device may be configured so as to become partially or completely disabled if communication from the backup device has not been received within a predetermined time period. The partial or total disabling of the device may be over-rideable by a user, either by disarming the disabling feature in advance of the portable data storage device going out of range or by entry of an appropriate password or pin number into the data storage device. Disablement may be temporary so that functionality of the device is resumed when communication is re-established. This may enable a user to leave a mobile telephone which is inoperable unless the user, with the backup device, is within range. Partial disablement may, particularly in the case of a mobile telephone, include access to only certain functions. For example, if a mobile telephone is out of range of the backup device, use may be restricted to dialling a number to report the phone as lost or to receive delivery of the user information for returning the phone or to provide a code or password to a central control centre to re-enable the portable data storage device.

Further alert procedures which may be initiated at the portable data storage device are described in more detail below, but they may include: alerting a separate network (for example a mobile telecommunications network) which may allow the portable data storage device to be disabled remotely, displaying a message (which may include details of how to return the portable data storage device) to indicate that the portable data storage device has been lost or stolen, or passing data to a separate network (for example, the mobile telecommunications network). In the last case, the data may include, for example, location information, or a unique identifier of the portable data storage device.

The data in the portable data storage device may be backed up to the backup device periodically or in response to the entering of new data into the portable data storage device. Data stored in the backup device may be backed up to a further device for increased security, and may be accessible by the further device. For example, data stored in the portable data storage device may be backed up to a computer and may be viewed on that computer. However, access may be restricted to only a portion of the data.

To increase security, it may be necessary to register the backup device with the portable data storage device before use. This may help to ensure that data is only transferred out of the portable data storage device to a recognised backup device.

According to a further preferred feature, the backup device may communicate with a separate network. This may allow the backup device to signal to a remote station in the network, for example a mobile telecommunications network, if the portable data storage device is out of range of communication. The backup device may transmit a unique identifier of the portable data storage device to the network, which may use the identifier for example to disable the portable data storage device remotely, or to locate the portable data storage device.

According to a further aspect, there is provided a method of operating a portable data storage device, the method comprising communicating periodically or quasi-continuously with a backup device over a wireless communication link to back up data stored within the portable data storage device. Preferably, an alert procedure may be triggered when the backup device is out of range of communication with the portable data storage device. The alert procedure triggered may comprise one of the alert procedures outlined above and may comprise triggering an audible, visual or vibrating alarm on the portable data storage device itself. Preferably, the alert procedure comprises diabling at least one function of the portable data storage device. The alert procedure may also comprise communicating a unique identifier of the portable data storage device to a network, which may be a mobile telecommunications network. The alert procedure may be triggered if the portable data storage device is out of range of communication with the backup device or may be triggered upon receipt of a signal over a wireless communication link operating within a second range when the portable data storage device has passed out a first range of communication with the backup device.

According to a further aspect, there is herein provided a method of operating a backup device, the method comprising periodically communicating with a portable data storage device over a wireless communication link to backup data stored in the portable data storage device; and triggering an alert procedure when the portable data storage device is out of range.

Preferred features of the operation of the backup device may be the same as those outlined above. According to a highly preferable feature, however, it may be necessary to pre-register the portable data storage device with the backup device before the two devices may be paired and before communication can be initiated. This may reduce the risk of unauthorised portable data storage devices communicating with the backup device and downloading data from the backup device. A plurality of portable data storage devices may be pre-registered and paired with the backup device. The backup device may be placed into an 'authorisation' mode of operation in order to allow registration and pairing. An alert proceude may be triggered in the event that an unauthorised device attempts to pair with the backup device.

A convenient way both of securing data and preventing unauthorised access to a mobile telephone (or similar device) may be to have a SIM card (or equivalent data storage device) for the mobile telephone provided in the backup device. In that way, when the backup device and mobile telephone are separated, the telephone is unusable and furthermore, the data in the SIM card is inherently secured. This may also enable the backup device to be used with devices such as "disposable" mobile telephones. These features may be provided independently. A further aspect provides a mobile telephone having a (short range) wireless link to a remote device containing SIM card data for the mobile telephone.

As used herein, the term mobile telephone is intended to encompass devices which are capable of text or data or graphic or video communication as well as or instead of voice communication, where the context so requires.

It has been appreciated by the inventors that the requirement for the backup device to have memory and a communication device may in fact be satisfied by another portable data storage device, such as a PDA. Thus, it is possible to implement the backup device as an application for another portable data communication device, such as a PDA.

In a development, it is possible for two (or more) portable data storage devices to be used to perform mutual backup and security functions for each other. It is greatly preferred, however, if the backup device is not a fully functional data storage device but has limited or no user input and output functions. Surprisingly, therefore, it is advantageous for the device to be provided with little functionality. Pursuant to the invention it has been appreciated that the backup device must be compact if it is to be carried with the user, which limits the user input and output interfaces which can usefully be provided. Furthermore, if the device has limited functionality, it is less likely that the user will use (and therefore possibly lose) the backup device itself. In preferred implementations, the backup device is compact and provided as a device which may be readily carried with the user, such as a credit-card sized device, a watch or watch insert, a key-ring or a clip-on device which can securely clip to a user or to an article of clothing. The backup device may have means for attaching securely but preferably removably (optionally permanently) to a person or to an article of clothing, such as a wrist strap, a clip, a belt clip, a pin or safety pin, a Velcro™ fastener, a tie clip, a self-adhesive pad or any other suitable fastening.

According to a further aspect, there is also provided a method of safeguarding against the separation of a central portable data storage device and at least one tagging device, the method comprising:

providing at least one wireless communication link for communicating between the central portable data storage device and the or each tagging device;

communicating periodically between the or each tagging device and the central portable data storage device over the or each wireless communication link;

initiating an alert procedure if the or each tagging device is out of range of communication with the central portable data storage device.

The central portable data storage device, or control unit, may be operated, for example, by an adult, who may provide a tagging to device to one or more children, or to a pet. The alert procedure may comprise displaying an identifier of the tagging device that is out of range, for example, a photograph of the holder of the tagging device. Further details of the users of the tagging devices may be stored either on the central portable data storage device or on the tagging units themselves. These details may include, for example identification details, medical records or selected medical details, or 'pet passport' details. The medical details stored may include, for example details of a past medical history, such as past heart attacks, or details specific to the user of the tagging device, for example if the user has diabetes or an allergy to a particular drug or food.

The backup device can, using current technology, be made very compact as it need only include a communication device, such as a Bluetooth (RTM) chip (which may be smaller than a postage stamp), some (flash) memory, limited processing power and a power source. All of these functions can readily be integrated into a small device, so small in fact that the backup device itself may be easy to misplace, which is why it is desirable for it to be securely attachable to clothing or integrated into another form of housing which the user is likely to use.

Preferably, the backup device is integrated into a housing which has functionality other than as a data storage device, for example as a key-ring, a credit-card, a watch or the like, as noted above.

There is also herein provided a method of securing a mobile telecommunications device comprising communicating between the device and a backup device to record a unique identifier of the mobile telecommunications device, preferably the IMEI number and/or the SIM card identifier, preferably automatically on initiation of backup of data to the backup device.

The invention extends to apparatus embodying the invention, to a computer program or computer program product or signal embodying the method, to a data storage device configured to operate with such a backup device.

An embodiment of the invention will now be described by way of example only with reference to the accompanying drawings in which.

Figure 4A:
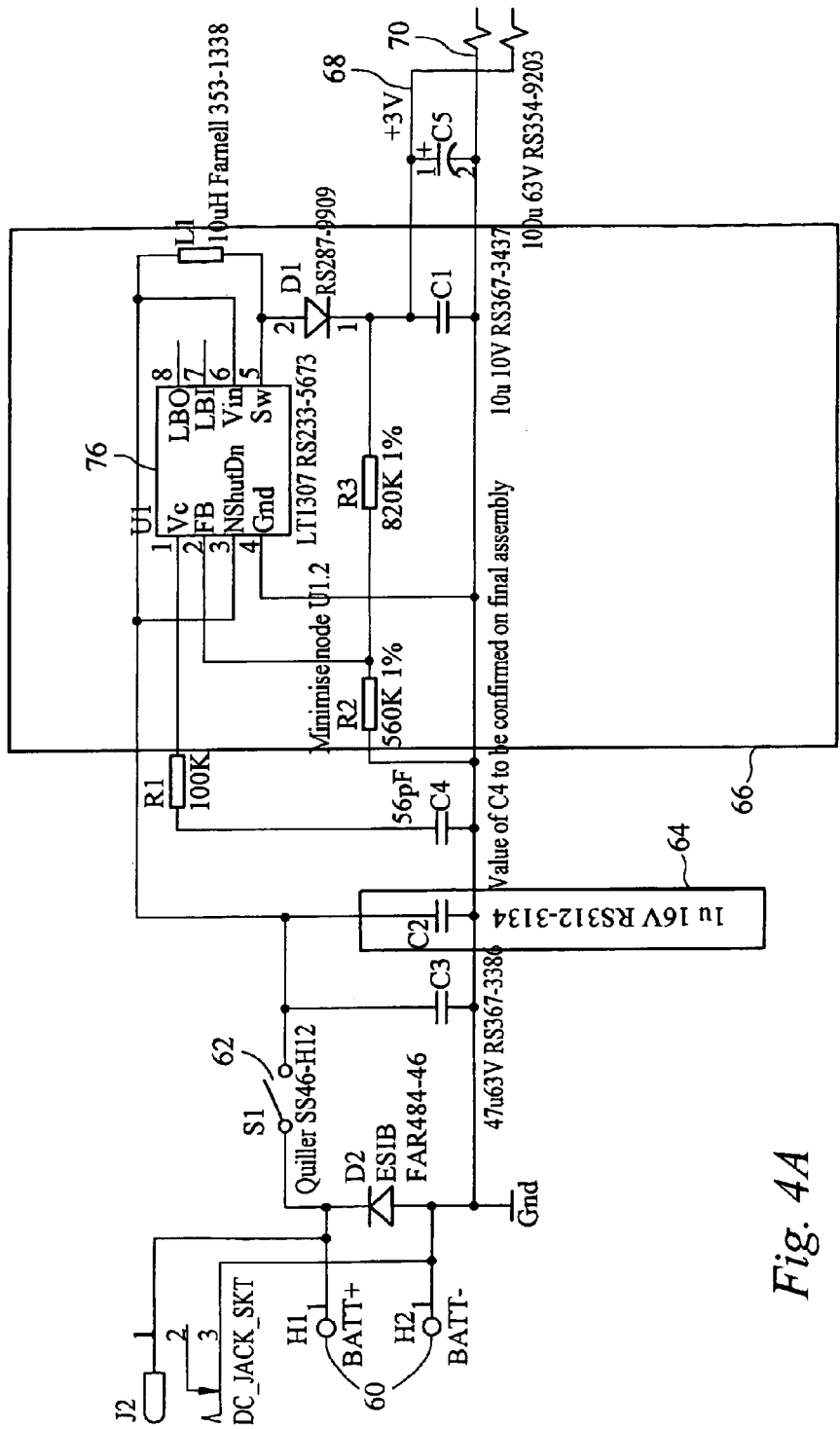
Figure 4B:
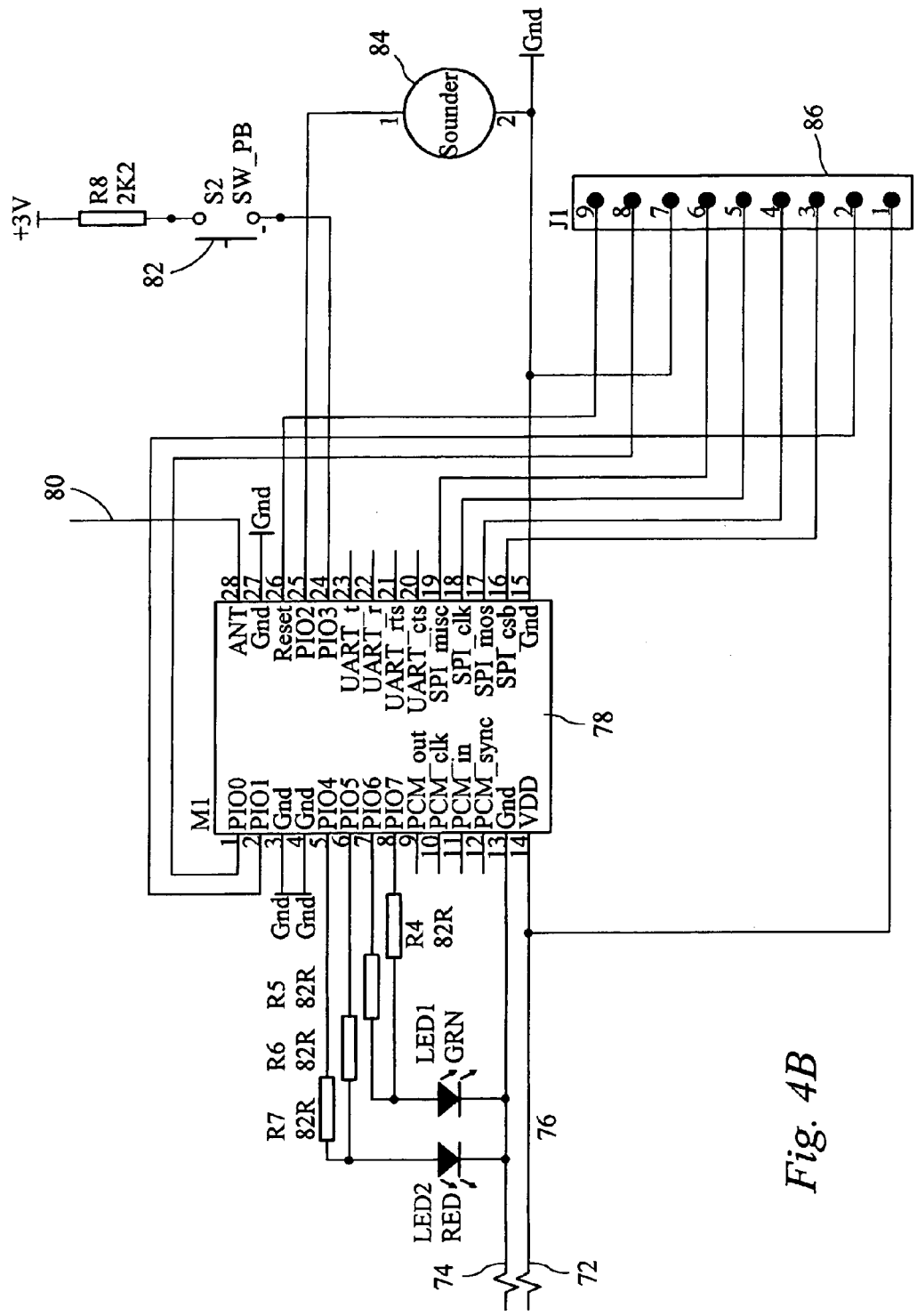

FIGS. 4*a* and 4*b* show two halves of a circuit diagram according to which one embodiment of the backup device may be implemented.

Figure 1:
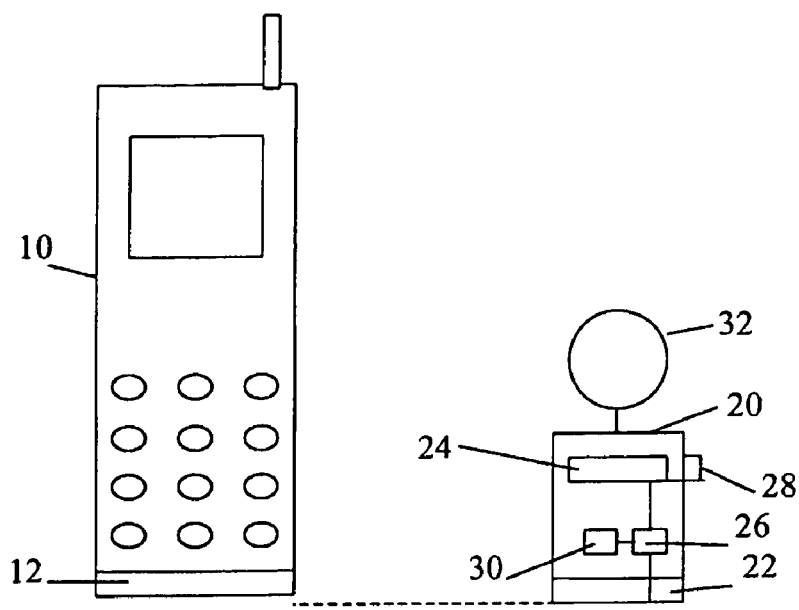
FIG. 1 shows a system in accordance with a first embodiment.

Referring to FIG. 1, a portable data storage device 10, in this embodiment in the form of a mobile telephone, includes a short-range wireless communication interface 12, in this embodiment in the form of a Bluetooth (RTM) transceiver chip. Although the transceiver is shown visible at the base of the device, typically it may be integrated within the device, or provided as an additional component integrated with a battery for the device or within the battery housing. The device 10 stores contact details and optionally appointments or other data within the body of the device or on a SIM card provided with the device and a processor within the device 10 communicates with the communication interface.

A backup device 20 has a short-range wireless communication interface 22, in this embodiment in the form of a Bluetooth (RTM) transceiver chip. An internal or external antenna may be provided, optionally on a circuit board. The backup device includes backup data storage 24, for example FLASH memory. The amount of memory may be as little as 1 Kb, for example to backup only key data but will typically be at least 64 Kbytes. Often considerably more memory, for example of the order of 1 Mb to 10 Mb and sometimes as much as 128 Mb or even more may be provided, depending on the capacity of the device 10. A processor 26 controls the operation of the backup device, specifically controlling communication via the interface 22 and storage of data, and also receives a user input 28 and controls an alarm device 30, for example a piezo electric sounder. A battery (not shown) is also provided within the housing (although the device may in some cases be powered by the transmissions from the portable data storage device). The alarm device may include a visible alert or a vibrating alert device. The user input 28 is preferably a simple input device, for example a single input button or a few buttons. A useful minimum function to implement with the user input device is cancelling of an alarm; other functions may be implemented by controlling the device via the communication interface. However, a more complex user interface may be provided, for example a voice recognition interface. The user interface may be omitted entirely; in such a case the alarm is preferably arranged to silence automatically after a predetermined time.

The backup device is provided in a convenient housing, here in the form of a key fob having a key ring 32 attached so that the device can conveniently be carried and is unlikely to be lost.

The device 20 may be attachable to or woven into an article of clothing. Alternatively or additionally, the device 20 may be integrated with or arranged to communicate with an item of "smart" clothing, that is clothing with some processing and memory function built in and optionally some human interface. The device may be provided as an application for an article of "smart" clothing.

In operation, software, for example stored within the main body of the portable data storage device 10, in the communication interface or on the SIM card, causes the processor of the portable data storage device to communicate with the communication interface to operate a data synchronisation algorithm over the interface with the backup device 20. Data synchronisation algorithms are well-known; in the present case a simplified, predominantly one-way, synchronisation algorithm may be employed as the data will not be changed by the backup device. Thus synchronisation may simply comprise updating the backup device with the contents of the portable data storage device at intervals, unless a "restore" sequence is invoked.

A single backup device may be employed to backup data, or detect loss, of more than one portable data storage device 10, for example a mobile telephone and a PDA may both be backed up to the same backup device. Furthermore, in such a case the data backed up may be independently stored or mutual synchronisation between all such devices may be performed for some or all of the data. For example, a PDA may back up contact, appointment and memo data and a mobile phone may back up only telephone number data; the telephone number data may be synchronised between the devices, or may be stored independently on the backup device.

The backup device may include other functionality, for example it may communicate with another network, for example a network for communicating positional information such as Geo Fencing application network. In such a case, the backup device may provide some of the functionality which might otherwise (or additionally) be provided by the portable data storage device. In particular, a user's position may be communicated using the backup device alone, for example if the portable data storage device is switched off.

The backup device may also be used in conjunction with a telemetry or telematics application, for example in which information is gathered by the device using the communication interface from other devices which pass into communication and is communicated to a central server.

The backup device may include yet other functionality, for example it may act as a key to a lock or alarm (for example for a vehicle, workplace or residence, other computing device or other resource); this may be achieved efficiently by making use of the communication interface. The device may include other "smartcard" functionality, optionally over the communication interface.

Figure 2:
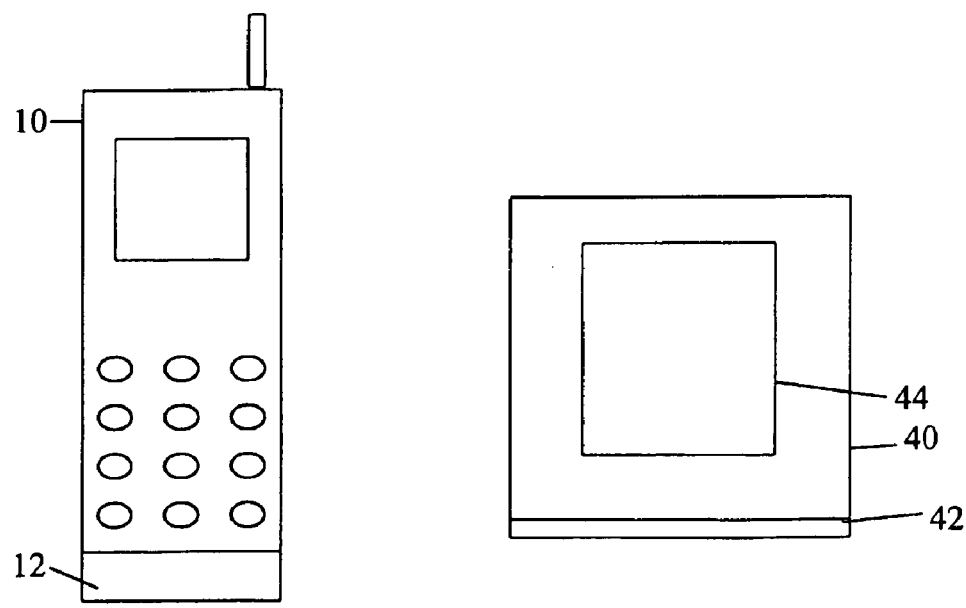
FIG. 2 shows a system in accordance with a second embodiment.

Referring to FIG. 2, an alternative embodiment provides the functionality of the backup device in a further portable data storage device 40, such as a handheld organiser. The further device 40 has a further communication interface 42, such as a Bluetooth (RTM) interface and has a touch screen for user input and output. The device 40 also includes a sounder, a processor and storage for data and for at least one application program, not shown. An application is downloaded to the portable data storage device 40 to communicate with the portable data storage device 10 and to provide a data synchronisation function. If the communication link is broken, an alert is sounded, preferably on both devices 10, 40. Furthermore, in the absence of a communication link, preferably at least one function of at least one device is inhibited or the device is switched into a "lost" mode displaying owner contact data.

The further portable data storage device 40 may allow input of data into the first portable data storage device 10. Data may be input into the further portable data storage device 40, for example using a keyboard, voice recognition software, or a handwriting recognition interface, for subsequent transfer into the first portable data storage device 10.

In one embodiment, the portable data storage device 10, 40, such as either of those shown in FIG. 1 or FIG. 2, may contain data such as the medical or dental records of the owner of the portable data storage device.

The following pseudo code explains the normal operation of the system:

Portable Data Storage Device 10
    Every [period, e.g. 1 second]:—
    Attempt communication with backup device 20
    If successful, transmit update information if required
    If unsuccessful activate PDS Alert procedure:—

Backup Device 20
    Every [period, e.g. 1 second]:—
    Attempt communication with PDS device 10
    If successful, receive update information if required
    If unsuccessful, sound alarm for period or until cancelled A typical PDSAlert procedure for the Device 10 may comprise:—
    Sound alarm for set period
    Display "lost"
    Disable calls except to designated retrieval number In addition, procedures are provided:—
(1) To register the backup and portable data storage devices with each other
(2) To transfer data from the backup device to the portable data storage device or to a replacement portable data storage device following loss of data.

Further alert procedures that may also be triggered by the separation of the portable data storage device 10 and the backup device 20 include those outlined below.

The portable data storage device 10 may alert a network to which it is connected. For example, a mobile telephone may send a Short Message Service (SMS) message to a controller within the mobile telephone network. This may allow the mobile telephone to be disabled by the network. A user may then be required to contact the network operator before use of the mobile telephone may be facilitated. Alternatively, an SMS message may be sent to the owner of the portable data storage device.

In an alterative alert procedure, the portable data storage device 10, in this case a mobile telephone, may connect to a central network control centre. This may occur automatically when the alert procedure is triggered, or the mobile telephone handset may enter an operational mode wherein a user is required to telephone a central network control centre before the handset may be used again. The central network control centre may require information, such as a code or a password, before the alert procedure may be exited and before further use of the handset is permitted.

According to a further alert procedure, the portable data storage device 10 may display a message, which may include text or graphics, to indicate that the device has been lost or stolen. This message may include, for example, details of how to return the portable data storage device 10 to its owner, or an identifier by which the police may identify the owner of the device. A password or code may be required to exit the alert procedure mode and remove the displayed message.

A further alert procedure may cause the portable data storage device 10 to emit an audible tone (in addition to or instead of the tone produced by the backup device 20). If the portable data storage device is a mobile telephone handset, then the audible tone may be a ring tone, which may be a specific ring tone to indicate that the handset has been lost or stolen. As for the previous alert procedure, a code or password may be required to stop the emission of the audible tone.

In a final alert procedure, the portable data storage device 10 may pass data to a network when the alert procedure is triggered. The network may be a control network over which the data may be passed to a central control centre. The data passed to the network may include, for example, location information for the portable data storage device 10 (which may be implemented if the portable data storage device 10 has Global Positioning System (GPS) capabilities). The data may also incorporate information about the owner of the portable data storage device, which may, for example, allow the owner to be informed of the loss of the device and reunited with the device if it is subsequently located. Further, the data may comprise a unique identifier, of the portable data storage device, for example the Bluetooth (RTM) serial number of the portable data storage device.

The alert procedures outlined above may be implemented individually, or a combination of the alert procedures may be used to increase security and the likelihood of the portable data storage device being returned to its owner after loss or theft. Each of the alert procedures may be implemented only after an initial delay and a number of alert procedures may each be implemented after a different initial delay. For example, an audible or visible alarm could operate at the backup device 20 immediately after initiation of the alert procedure, and the portable data storage device 10 could implement a further procedure, for example telephoning a central network control centre, after a preset delay period, for example an hour, if the alert procedure has not been aborted during this period.

It may be noted that any of the embodiments outlined above may be implemented in a two-way, symmetrical mode of operation. For example, the portable data storage device may also alert the user if the backup device is lost or stolen.

Furthermore, the backup and communication procedures between the portable data storage device 10, 40 and the backup device 20 outlined above may be initiated automatically when the devices come into range of each other. Alternatively, the procedures may be initiated at the request of the user, or only when the portable data storage device is put into a particular mode of operation.

It may also be noted that the backup device may provide output means, for example a screen or means for outputting data to a further device such as a computer, on which the data backed up from the portable data storage device may be displayed. This may allow the data to be accessed even when the portable data storage device itself is unavailable. For example, backed up address book data may be accessed on the backup device when the portable data storage device is unavailable, for example if the portable data storage device has been lost or is being used to make a telephone call.

A further embodiment will now be described with reference to FIG. 3 in which a plurality of tagging units 54, 56, 58 may be provided to communicate with a central control unit 50. The central control unit 50 may comprise the same functionality as each of the tagging units 54, 56, 58, but, in a preferred embodiment, the central control unit 50 comprises additional functionality, as described below.

In this embodiment, the central control unit 50 communicates periodically with the tagging units 54, 56, 58, as described above for FIG. 1. The central control unit 50 further comprises display means 52, for example a screen, via which the owner of the central control unit 50 may obtain information. This information may comprise, for example, the time at which each of the tagging units 54, 56, 58 was last contacted by the central control unit 50, or the distance between the central control unit 50 and each of the tagging units 54, 56, 58.

Figure 3:
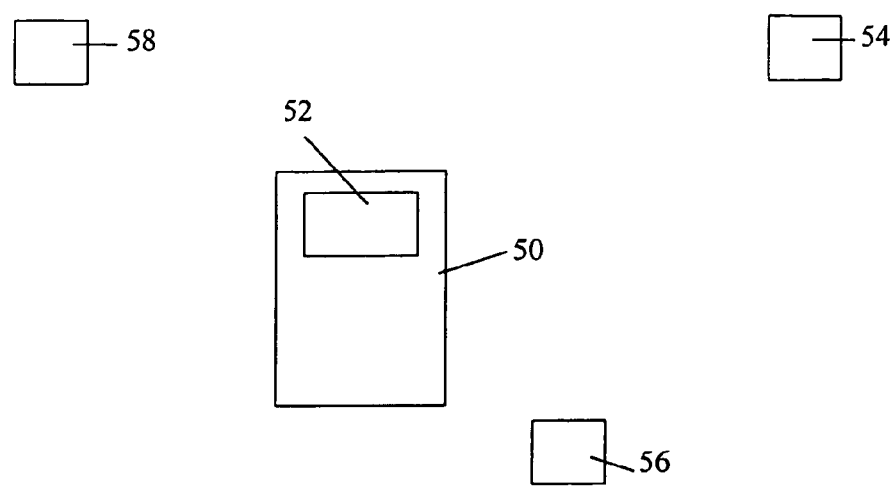
FIG. 3 shows a system in accordance with a third embodiment.

According to one embodiment, the central control unit 50 of FIG. 3 may be used by a parent or adult to monitor the movements of children, each of whom have been given a tagging unit 54, 56, 58. The central control unit 50 may implement an alert procedure, such as one of the procedures outlined above if the tagging device 54 belonging to a particular child moves beyond a predefined range. Different ranges may be set for different tagging devices and an alert procedure may involve notification of both the central control unit 50 operator (the parent) and the tagging device holder (the child). The alert procedure may comprise, for example, the central control unit 50 displaying a picture of the child who holds the tagging unit 54 that has moved out of range. This picture may then be used by the parent, for example to aid security guards or the police in identifying the child more easily. The alert procedure may also comprise an audible warning being emitted by the tagging device 54 to aid retrieval of the child.

In one embodiment, the central control unit 50 may be the mobile telephone handset belonging to the parent.

FIGS. 4*a* and 4*b* illustrate two halves of a circuit layout of the backup device according to one embodiment of the present invention. This layout is shown by way of example only and modifications may be provided or alternative or additional components may be substituted for those shown.

With reference to FIG. 4*a*, in this embodiment, a dry cell or rechargeable battery 60 may be used to provide the power supply. An on/off switch 62, shown here as a slider switch, may be provided. In this embodiment, maximum width tracks are used for all battery connections outside the psu room to maximise the ground plane for all psu components and the battery. RF style tracking (max width and short) may be provided (part of psu room). Further, a switchmode regulator 76 may ensure that the BlueCore supply is maintained at 3.0 +−0.1 Volts.

The circuit of FIG. 4a continues in FIG. 4b, with points 68 and 70 connecting to points 72 and 74 respectively. Paired outputs 76 may each source 4ma. In this embodiment, a Mitsumi WML-C06NH integrated circuit 78 is used as an integrated Bluetooth (RTM) transceiver and microprocessor running a stored program to implement the software, but other devices may also be suitable and may provide the same or similar functionality. An antenna 80, a push button 82, a sounder 84 (in this case a Piezo Sounder) and a 9-way header 86 may also be provided.

The above description is provided by way of example only and modifications of detail may be provided.

The invention claimed is:

1. A method of safeguarding against loss of data stored in a primary portable data storage device, the method comprising providing a user-carried secondary backup device having memory and a wireless communication link for communicating with the primary portable data storage device;
   communicating periodically or quasi-continuously between the secondary backup device and the primary portable data storage device over the wireless communication link so as to automatically backup data entered into the portable data storage device and so as to check for removal of the primary portable data storage device;
   signalling an alarm to alert a user to loss of the primary portable data storage device in the absence of communication between the primary portable data storage device and the backup device for a predetermined period.

2. A method according to claim 1 wherein said wireless communication link is a Bluetooth (RTM) link.

3. A method according to claim 1 wherein signalling of the alarm is suspended if the wireless communication link is being used by the portable data storage device.

4. A method according to claim 1 wherein an alarm is signalled in the event of interruption of communication between the portable data storage device and the backup device of at least one second.

5. A method according to claim 1 further comprising receiving a user input to disable the alarm.

6. A method according to claim 1 further comprising triggering an alert procedure on the portable data storage device if the portable data storage device is out of range of communication with the backup device for a predetermined period.

7. A method according to claim 1 further comprising inhibiting operation of the portable data storage device in the absence of communication with the backup device.

8. A method according to claim 1 wherein data is backed up in response to entering of new data into the portable data storage device.

9. A method according to claim 1 wherein data stored in the backup device is accessible by another data storage device via a machine interface.

10. A method according to claim 1 further comprising registering the backup device with the portable data storage device.

11. A method according to claim 1 further comprising communicating between the backup device and a network wherein the network is a telecommunications network and wherein the backup device signals to a remote station in the telecommunications network if the portable data storage device is out of range of communication.

12. A method according to claim 1 wherein communicating between the backup device and the portable data storage device over the wireless communication link operates at a selected one of a plurality of power levels.

13. A method according to claim 12 wherein communication initially operates at a first power level but switches to operating at a second power level if the portable data storage device does not pass out of range of communication with the backup device throughout a predetermined time period, wherein the second power level is lower than the first power level.

14. A method according to claim 1 further comprising communicating at least one unique identifier of the portable data storage device over the wireless communication link to the backup device wherein the at least one unique identifier comprises at least one of:
   the International Mobile Equipment Identity number (IMEI) of the portable data storage device;
   the Bluetooth (RTM) serial number of the Bluetooth (RTM) chip within the portable data storage device.

15. A method of safeguarding against loss of data stored in a portable data storage device, the method comprising providing a user-carried backup device having memory and a wireless communication link for communicating with the portable data storage device;
   communicating periodically or quasi-continuously between the backup device and the portable data storage device over the wireless communication link at a selected one of a plurality of power levels to backup data entered into the portable data storage device and to check for removal of the portable data storage device;
   signalling an alarm to alert a user to loss of the portable data storage device in the absence of communication between the portable data storage device and the backup device for a predetermined period;
   wherein communication initially operates at a first power level but switches to operating at a second power level if the portable data storage device does not pass out of range of communication with the backup device throughout a predetermined time period, wherein the second power level is lower than the first power level.

* * * * *